United States Patent [19]

Sampson

[11] Patent Number: 4,574,098

[45] Date of Patent: Mar. 4, 1986

[54] PATTERN TRANSPOSING TAPE

[76] Inventor: James D. Sampson, 14257 Burning Tree Dr., Victorville, Calif. 92392

[21] Appl. No.: 520,913

[22] Filed: Aug. 8, 1983

Related U.S. Application Data

[63] Continuation-in-part of Ser. No. 134,198, Mar. 27, 1981, abandoned.

[51] Int. Cl.$^4$ .............................. B32B 7/10; C09J 7/02
[52] U.S. Cl. .................................... 428/40; 428/212; 428/213; 428/343; 428/492; 428/521; 428/522; 428/914
[58] Field of Search ............... 428/354, 40, 41, 335, 428/198, 346, 212, 213, 343, 492, 522, 521, 914; 156/63, 71; 426/456, 416; 427/208, 209, 208.4

[56]  References Cited

U.S. PATENT DOCUMENTS

| | | | |
|---|---|---|---|
| 2,607,711 | 8/1952 | Hendricks | 428/40 |
| 2,805,183 | 9/1957 | Higgins | 428/41 |
| 2,914,167 | 11/1959 | Holtz | 427/208 X |
| 4,273,827 | 6/1981 | Sweeney et al. | 427/208 X |

Primary Examiner—Thomas J. Herbert
Attorney, Agent, or Firm—John H. Crowe

[57]  ABSTRACT

A type of tape which embodies two faces each containing a pressure sensitive adhesive coating. One face has a coating with a lesser degree of adhesive capability than the coating on the opposite face. The latter can be placed on a first material to form a pattern thereon, thus leaving the face with the coating having the greater degree of adhesive capability exposed. An object having a meeting surface may then be applied to the exposed coating. When that object is removed from the first material, the tape pattern is transposed to the backside of said object. This eliminates the necessity of using measuring tools and conventional methods to find and transpose the pattern from the first material to said object.

7 Claims, 10 Drawing Figures

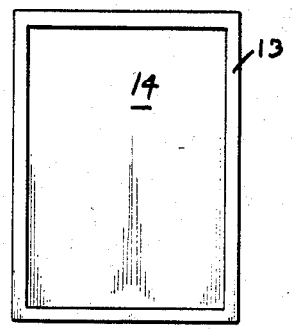
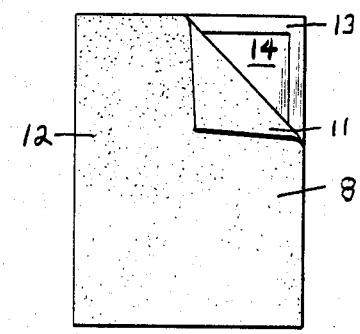
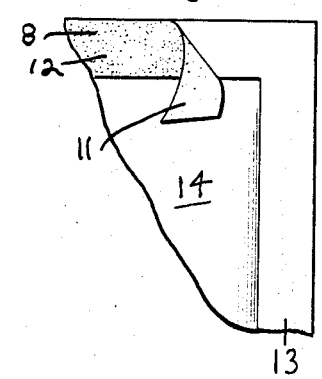
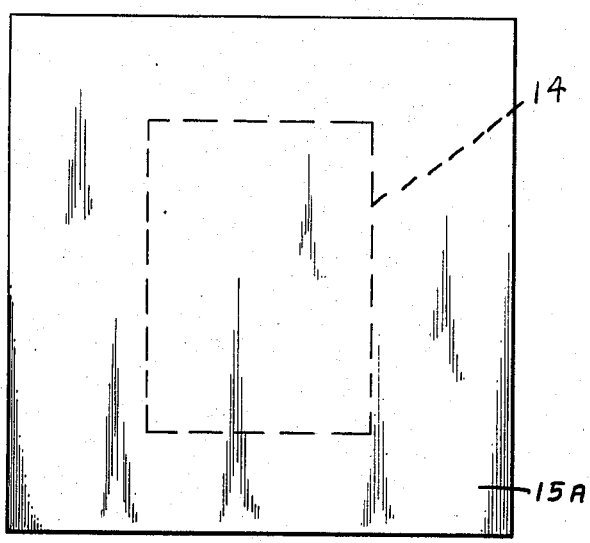
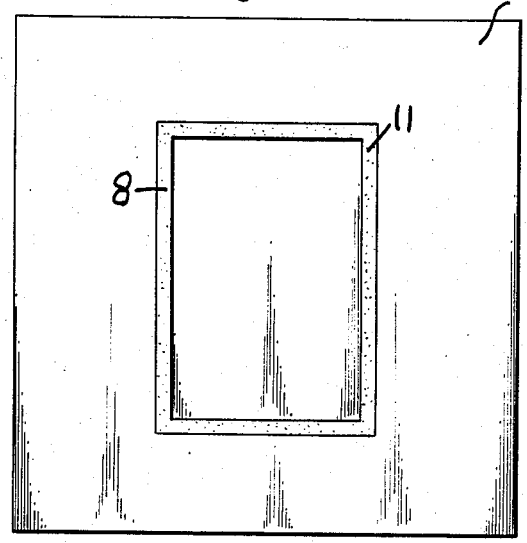
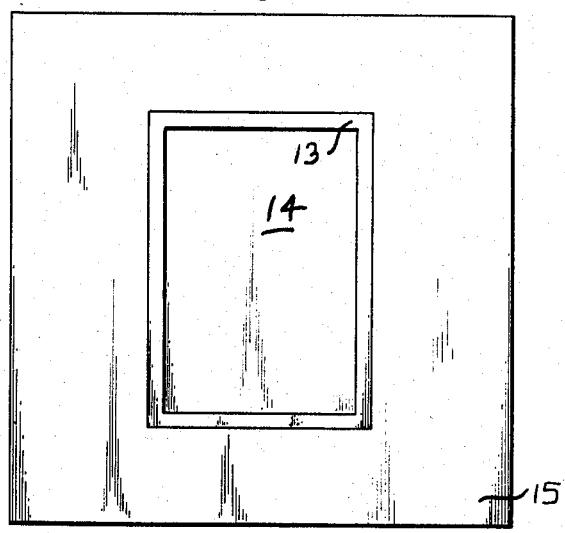
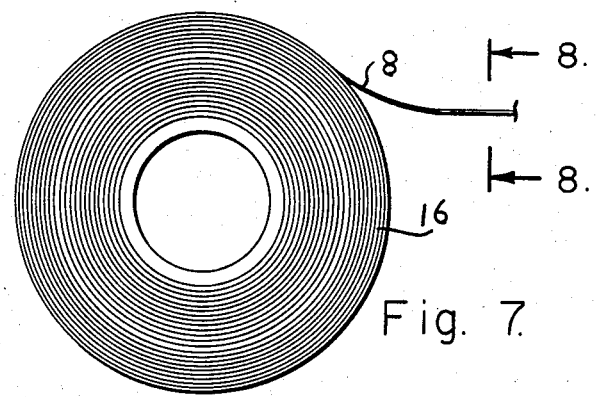
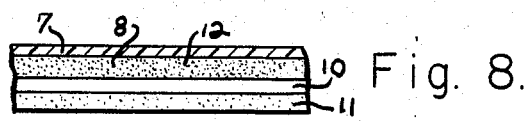
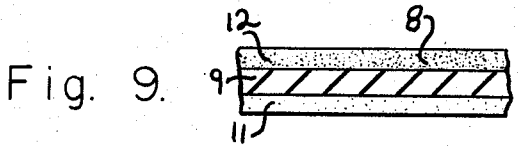
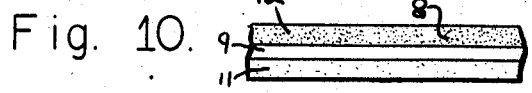

PATTERN TRANSPOSING TAPE

CROSS-REFERENCE TO RELATED APPLICATIONS

This application is a continuation-in-part of my co-pending U.S. application Ser. No. 06/134,198, filed Mar. 27, 1981, now abandoned.

BACKGROUND OF THE INVENTION

The present invention deals with the problems of persons performing the task of removing at least one section of an object having a meeting surface which may consist of material such as dry wall, wood grain, masonite and other types of paneling, tiles, carpeting and the padding therefore, wood fabrics, clothes, etc. to be installed on an existing surface embodying first materials such as vents for air conditioning and/or heater units, electrical convenience receptacles or the like, windows, doors, etc. to allow said first materials to perform their functions after the installation of said object having a meeting surface. These persons must devote a substantial amount of time in measuring and employ some sort of straight-edge device to find and establish the correct pattern of the first material, which then must be transposed to the object having a meeting surface to define at least one section of the latter that must be removed to allow said first material to perform its above-indicated function. Some problems which occur in such installation process result from human error, such as, for example, when a single measurement is not correct or if the measurement is correct, the person transposing that measurement to the object having a meeting surface makes an error. If an error is not corrected before any removal of the unwanted sections of said material according to the aforesaid pattern, this could destroy the usefulness of said object having a meeting surface and prevent it from being permanently installed, thus possibly wasting that object, money, time, etc.

SUMMARY OF THE INVENTION

The main object of the present invention is to make readily available a relatively inexpensive means of marking at least one pattern of the aforesaid first surface on the aforesaid object having a meeting surface to be installed which means requires no measuring to find and establish said pattern on said object prior to modification or removal of a part of the latter.

The present invention is an improved means for finding and establishing at least one pattern of a first material on the surface of another material for any purpose. The means (sometimes hereinafter referred to as tape means or tape) comprises a type of backing material in the form of a thin piece of a compressibly deformable material, preferably of sponge rubber or a paper type backing. The backing material has two faces, each of which contains a pressure sensitive adhesive coating. The pressure sensitive adhesive on one face of the backing material is of greater adhesive capability than the pressure sensitive adhesive on its opposite face. The face with lesser adhesive capability may be affixed to the aforesaid first material to form a pattern of that material thereon. This leaves the face containing greater adhesive capability facing outwardly. Applying said material having a meeting surface in the correct position to said first material and pressing it there against then removing the former causes the tape to adhere to and form a much stronger bond with the material having a meeting surface because of the greater adhesive capability of the face of the tape means in contact therewith and be retained by the latter when it is removed from the first material. This action of the tape results in a transposed pattern from and of said first material to the object having a meeting surface, thus marking areas to be cut from said object having a meeting surface so that it fits around said first material and exposes the latter for use after installation of the former on a wall or the like. No measuring device or straight edge or time consuming steps, such as now required to mark cutout portions of wall panels, tiles and the like to be installed around electrical outlets, windows, etc., are necessary where my novel tape means with its faces of different strength adhesive are used as indicated above.

U.S. Pat. No. 2,607,711 to Hendricks discloses a low adhesion coating for use in conjunction with pressure sensitive adhesive tape in such fashion as to permit "the tape to be unwound from the roll with much less effort". FIG. 5 of Hendricks shows a roll of pressure sensitive tape having a removable liner with the low adhesion coating thereon. The whole thrust of the Hendricks disclosure is toward this low adhesion coating material, there being no suggestion therein of any tape with pressure sensitive adhesive coatings of different adhesive properties on its two sides, or of any reason why such a tape would be needed or desired. In that connection, Hendricks discloses only a tape with a pressure sensitive adhesive coating on one face, on the one hand, and a tape with pressure sensitive adhesive coatings of equal adhesive capabilities on its two faces, on the other hand.

U.S. Pat. No. 4,273,827 to Sweeney et al. discloses assemblies with adhesives of different character on either side of "barrier means," intended primarily for use in the attachment of side body moldings to automobiles, the holding of automobile windows in place, securing of deck lids and hood components to each other, and for similar vehicle-related uses. The Sweeney et al. adhesives can be encapsulated liquids, spongy adhesive masses, solids with protective coverings, caulking materials, etc. All of the Sweeney et al. adhesives are intended for *permanent* attachment to whatever surface they are applied, as opposed to my adhesive coating of lesser adhesive capability which is designed for only *temporary* adherence to a surface of contact, from which surface it can, as indicated above, be subsequently pulled away therefrom.

BRIEF DESCRIPTION OF THE DRAWINGS

FIG. 1 is a front elevational view of an electrical convenience receptacle box.

FIG. 2 is a similar view of the receptacle box partially covered by a sheet of tape means in accordance with this invention.

FIG. 3 is an enlarged fragmentary view of an edge of the receptacle box showing a strip of tape in accordance with this invention partially adherent thereto with its side of lesser pressure-sensitive adhesive capability in contact therewith.

FIG. 4 is a front elevational view of an object having a meeting surface, in the form of a tile, temporarily placed over said receptacle box in the position in which it is to be permanently installed.

FIG. 5 is a rear elevational view of said object having a meeting surface removed from said receptacle box.

FIG. 6 is a front elevational view of said receptacle box exposed in the final result of the installation of said object having a meeting surface.

FIG. 7 is a side elevational view of a roll of pattern transposing tape in accordance with this invention.

FIG. 8 is an enlarged, fragmentary side view of the FIG. 7 tape.

FIG. 9 is a fragmentary side view of a form of pattern transposing tape in accordance with this invention having a type of sponge rubber backing material.

FIG. 10 is a view similar to FIG. 9 but having a type of paper backing material.

DESCRIPTION OF PREFERRED EMBODIMENTS

Turning now to FIG. 1, there is shown a view of a first material 14, illustrated as being an electrical convenience outlet box or the like, consisting of side walls 13 which extend outwardly from a back wall.

As partially illustrated in FIGS. 2 and 3, my two-sided pattern transposing pressure sensitive adhesive tape, shown at 8, may have any configuration, color or texture it only being required to contain two faces, one face 12 having a greater pressure sensitive adhesive capability than the opposite face 11. In use, the tape 8 is pressed against at least one edge 13 of the outlet box with its face 11 of lesser adhesive capability in contact therewith.

FIGS. 4, 5 and 6 illustrate first (in FIG. 4) the front surface 15a of a square tile pressed against the outlet box 14 to which has been affixed my pattern transposing tape in the manner illustrated in FIG. 3. The tile is pressed against the outlet box in the position in which it is to be installed. FIG. 5 shows the reverse surface 15b of the tile with the face 12 of the tape 8 adhered thereto and its face 11 exposed, as it appears after the tile is pulled away from the outlet box to leave a pattern of the latter thereon. A section of the tile corresponding to the pattern can then be removed to permit installation of the tile. In FIG. 6 the tile has been installed to expose the outlet box and leave it free to perform its intended function.

As shown in FIGS. 7 and 8, a roll 16 of pattern transposing tape 8 with a paper type backing material 10 is illustrated. The paper type backing material 10 has two faces, each containing a pressure sensitive adhesive coating. However, one face (12) has a greater pressure sensitive adhesive capability than the opposite face (11). In FIG. 8 a removable liner 7 is comprised of paper (flat or crepe) or cloth which is coated on both sides with a low adhesion coating. In FIG. 7 the liner 7 is interwound with the pattern transposing pressure sensitive adhesive tape 8, and the latter is located in the roll 16 between turns of the liner to prevent adjacent turns of the tape 8 from sticking together. The tape 8 and liner 7 are wound so that the liner is on the outside. When drawn from the roll 16, the liner 7 can be readily separated due to its low adherency.

FIG. 9 is a side view of a section of pattern transposing tape 8 utilizing a compressibly deformable material 9, preferably of sponge rubber, as a backing material. This backing material 9 has two faces, one face having a coating 12 of greater pressure sensitive adhesive capability than the coating of pressure sensitive adhesive 11 on the opposite face.

FIG. 10 is a side view of a section of the pattern transposing tape utilizing a paper type backing material 9. This backing material has two faces, one face having a coating 12 of greater pressure sensitive adhesive capability than the coating 11 of pressure sensitive adhesive on the opposite face.

EXAMPLE

Adhesives suitable for use on my novel tape can utilize formulations taken from the polyvinylethylether based pressure sensitive adhesives, which are basically comprised of a type of elastomer that is usually either a high molecular weight synthetic or natural rubber, polyvinylethylether, or an acrylate polymer. EDBM and EDBN are high molecular weight grades of polyvinylethylether which impart the basic cohesive strength to the adhesive. EDBM and EDBN are trade names of Union Carbide Corporation, Chemicals and Plastics Division. A type of tackifier resin is added to the elastomer to improve tack or adhesive strength. A type of plasicizer described as low molecular weight additives, such as EDBC (trade-named by Union Carbide Corporation, Chemicals and Plastics Division) or such as mineral oil, lanolin, liquid polyacrylates, and standard vinyl plasticizers, e.g., dioctylphthalate, are added to improve low temperature flexibility, wetting properties and quick tack to improve compatibility of the system. A type of filler, such as zinc oxide, titanium dioxide, calcium carbonate, clays, colorants, etc., are added to reduce costs, reinforce, soften, or to alter some other property of the adhesive in a desired manner. An antioxidant will be added if the adhesive during its use is exposed to elevated temperatures, e.g., hot-melt pressure sensitive adhesives. Non staining rubber antioxidants, metal dithiocarbamates, metal chelating agents are among the group employed.

A formulation taken from the polyvinylethylether based pressure sensitive adhesives is used to produce an adhesive surface as applied on face 11 of my illustrated tape. Polyvinylethylether type pressure sensitive adhesive comprised of decreased amounts of EDBM, EDBN, inorganic fillers, and tackifying resins in the adhesive formulation yields a low adhesive capability surface with reduced peel strength. To produce a formulation taken from the polyvinylethylether based pressure sensitive adhesive to produce an adhesive surface as applied on face 12 of said tape, increased amounts of tackifying resins are incorporated in said formulation to yield a pressure sensitive adhesive surface with increased adhesive capability and peel strength.

It should be understood that the present invention is not limited to those adhesive formulations, backing materials, etc., specifically mentioned above but is broad enough in concept to encompass any adhesive formulations and/or backing materials suitable for my purpose as taught herein. That purpose is to provide a pattern transposing tape or the like with adhesive coatings on its two faces of differing adhesive capabilities for temporary attachment of one face to a first surface of an object (so that it can be subsequently separated from that surface in the above-indicated fashion) and permanent attachment of the other face to another surface of a wall panel, tile, or the like to leave a pattern of said object on that surface when the tape is interposed between the two surfaces and the latter is pulled away from said first surface in the previously described manner. For example, the two adhesive coatings can be coatings of different thicknesses of the same adhesive formulation. More specifically, the adhesive coating of greater adhesive capability could be twice the thickness of the other adhesive coating. Typically, where the adhesive is a rubber-based or polyvinylethylether adhesive of the above-described type, the coating of greater adhesive capability might have a thickness of two mils and the other coating a thickness of one mil. These thicknesses are dry coat thicknesses, that is, the thicknesses of the coatings after they have dried, not as first applied in liquid form.

Materials other than those specifically mentioned above which are suitable for use as a backing material in the tape of this invention include urethane films, PVC film, neoprene, polyethylene sponge, etc. An appropriate backing material can be easily selected by one skilled in the art, depending upon the degree of hardness, weight, pliability, sponginess, etc., desired therein.

The tape can be provided with a removable liner on each side, within the scope of my invention. Strips of such a tape can be prepared for use so that one employing the tape can merely grab a few of the strips as needed, rather than having to unroll the tape, cut off pieces, etc., as he works. Such strips can be presized, preperferated, etc., for particular applications, as desired.

As will now be apparent, my novel invention is not limited to the forms thereof specifically described and illustrated herein, but includes within its scope all embodiments encompassed by the language of the following claims.

I claim:

1. A thin flexible material having a pressure sensitive adhesive coating on each face, the adhesive coating on one face having greater adhesive capability than the adhesive coating on the opposite face whereby said material can be affixed to a surface of an object with the adhesive coating of lesser adhesive capability in contact therewith and whereby another surface, separate from said object, can then be brought into contact with said flexible material so that its adhesive coating of greater adhesive capability is in contact with the latter surface, and whereby said latter surface can then be pulled away from the surface of said object to leave said flexible material adherent to said latter surface in the form of a pattern defining an outline of at least part of said object;

said adhesive coating of greater adhesive capability comprising an elastomer selected from the group consisting of high molecular weight synthetic and natural rubbers, polyvinylethylether, and acrylate polymers and contains a quantity of tackifier resin sufficient to give it relatively high adhesive strength, and the adhesive coating of lesser adhesive capability comprising an elastomer selected from the group consisting of high molecular weight synthetic and natural rubbers, polyvinylethylether, and acrylate polymers and containing a quantity of tackifier resin less, on a percentage of total weight basis, than that in the adhesive coating of greater adhesive capability.

2. A thin flexible material in accordance with claim 1 in tape form.

3. A thin flexible material in accordance with claim 2 having a removable liner on at least one of its faces.

4. A thin flexible material in accordance with claim 3 in which each of its faces has a removable liner.

5. A thin flexible material in accordance with claim 1 in which the chemical ingredients of the adhesive coating of greater adhesive capability are substantially the same as the chemical ingredients of the adhesive coating of lesser adhesive capability.

6. A thin flexible material in accordance with claim 5 in tape form.

7. A thin flexible material in accordance with claim 6 having a removable liner on at least one of its faces.

* * * * *